March 6, 1962  B. T. BONE, JR  3,024,171
METHOD AND APPARATUS FOR TREATING DISTILLATION OVERHEAD
Filed May 16, 1958  2 Sheets-Sheet 1
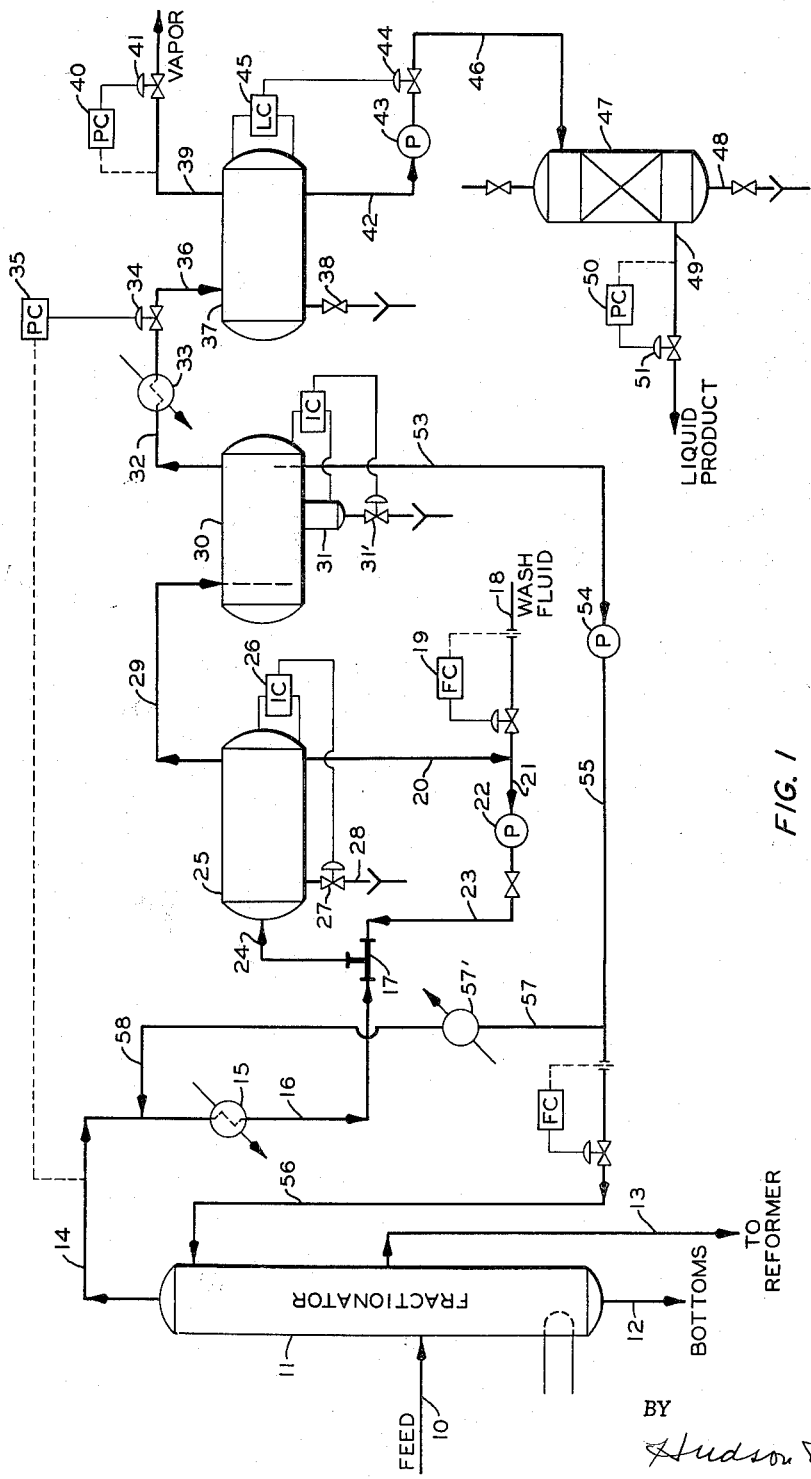
FIG. I
INVENTOR.
B.T. BONE, JR.
BY
Hudson & Young
ATTORNEYS

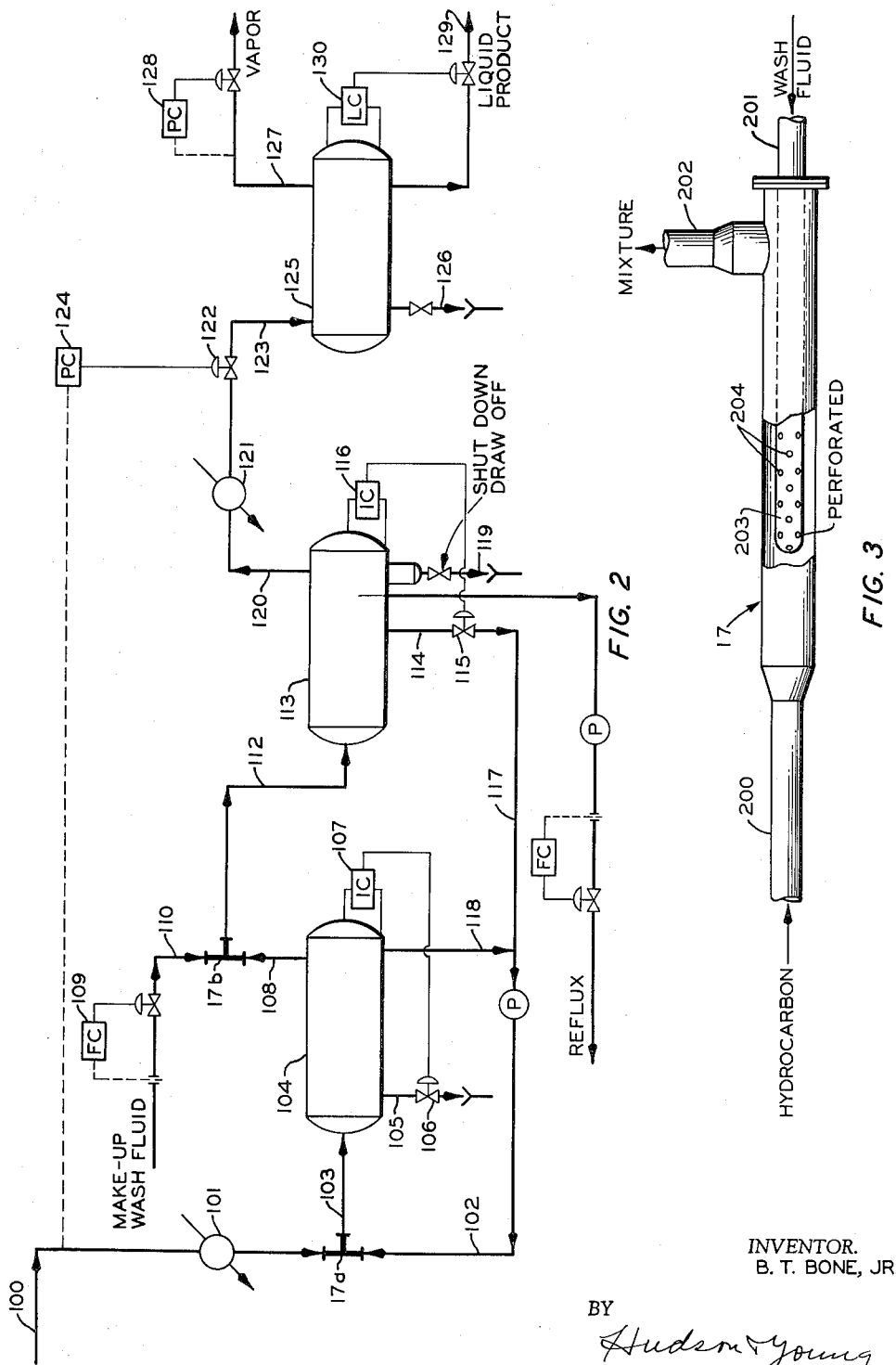

United States Patent Office 3,024,171
Patented Mar. 6, 1962

3,024,171
METHOD AND APPARATUS FOR TREATING
DISTILLATION OVERHEAD
Bertram T. Bone, Jr., Kansas City, Kans., assignor to Phillips Petroleum Company, a corporation of Delaware
Filed May 16, 1958, Ser. No. 735,851
18 Claims. (Cl. 202—66)

This invention relates to a method and to an apparatus for treating a distillation overhead. In one of its aspects, the invention relates to a method and to an apparatus for treating a distillate condensate, for example, a gasoline-type hydrocarbon, by washing the same with an immiscible treating agent, such as water or an alkaline or non-neutral solution, just after it has been condensed. In another of its aspects, the invention relates to a method and an apparatus wherein a distillate at least in part is condensed, the condensate is treated as herein set forth and described, a portion of the treated condensate is returned as reflux to the distillation operation and wherein the pressure is maintained on the distillate, essentially the same as it is on the vapor forming the distillate by condensation, during the treating thereof and at least until a portion of it has been obtained and returned as reflux. In a further aspect, the invention, in one embodiment, provides a combination of tanks in which treatment is effected of the condensate as soon as it has been formed and a reflux stream is obtained while maintaining the pressure of the vapors and on the condensate by operating and controlling a pressure reducing valve or zone downstream of the tanks responsive to the pressure of the vapors emanating as overhead from the distillation zone or vessel. In a still further aspect, the invention provides a wash or rinse for a condenser being used to condense a distillable vapor, the rinse being a portion of the purified condensate obtained as herein described and being introduced into the vapors substantially at the point or area at which harmful deposits tend to form as the vapors are cooled, the purified condensate being, preferably, at substantially the temperature of the vapors at the said point or area. In another aspect, the invention relates to and makes use of a liquids intermingling method and device in which the substantially immiscible liquids involved are flowed in opposite directions in concentrically disposed zones, one of which is liquid pervious.

The art of distillation and the treatment of distillates in various manners and for diverse purposes is well known. This invention is based upon certain specific concepts to which attention is now invited by reference to the prior art.

It has been known for some time that corrosion is caused in equipment handling distillates or condensates resulting from the distillation of liquids giving rise to deposition in said equipment of corrosive salts and/or other corrosive substances, for example, chlorides, acids, $H_2S$, and the like. In the petroleum refinery, for example, it is known to add lime to petroleum oil charged to a still. Also known are the steps of injecting ammonia into fractionators or ammonia or its solutions at a point in the condensing system at which water in the vapors normally liquefies onto the equipment surfaces. Since these steps have certain disadvantages, it has been proposed to introduce liquid water into the vapor line just ahead of the condenser. This water is said to wash away deposited salts or other corrosive materials dropping out from the vapors as these are about to condense.

The introduction of a treating agent into the vapors before or as they are condensing poses the problem of an increased pressure drop which is undesirable in many distillation operations for reasons evident to one skilled in the art.

I have found it possible by method and means later described to inject the treating agent after the vapors have condensed, without additional pressure drop and without suffering any significant corrosion of the condenser and equipment downstream of the same, it being desired to condense the vapors at a pressure as close to the tower overhead pressure as possible to take full advantage of the condenser temperature.

It is an object of this invention to provide a method and an apparatus for treating a distillation overhead. It is another object of the invention to provide method and apparatus for treating a distillate just after it has condensed without suffering significant corrosion of the condenser. It is a further object of the invention to provide a method and an apparatus for avoiding corrosion of equipment by distillation overhead by treating said overhead without incurring additional pressure drop on the vaporous distillate. Another object of the invention is to provide method and apparatus for obtaining a reflux consisting of treated distillate substantially at the pressure of the overhead vapors. It is a still further object of the invention to provide alternative embodiments of method and apparatus for making efficient use of treating agent, one of the alternative embodiments presently being, it is believed, a patentable improvement over the other but set forth, described and claimed herein merely to avoid duplication of time, effort and expense. Still another object of the invention is to provide method and apparatus for controlling the treating of a distillate and the formation and use of a reflux both substantially at the pressure of the distillate when it is still a vapor. A still further object is the treatment of a petroleum distillate condensate with water or other treating agent to remove therefrom impurities, such as chlorides, hydrogen sulfide, etc. Still another object of the invention is the provision of a method and means for preventing harmful deposits in a condenser being used to condense a distillate vapor containing substances which tend to form such harmful deposits or to corrode this piece of equipment. A further, but not final, object of the invention is to provide a novel means for intermingling substantially immiscible liquids.

Other aspects, objects and the several advantages of the invention, as it is based upon its several concepts, are apparent from this disclosure, the drawings and the appended claims.

The applicability of the invention in its several aspects will now be illustrated to one skilled in the art with respect to treatment of a gasoline distillate with water. He, having studied this disclosure, its accompanying drawings and the appended claims, will understand that the same or similar or other distillates can be treated with water or chemically active solutions or substances within the scope of the appended claims.

According to the present invention, in one of its broad forms, the fractionator or distillation overhead is treated to reduce impurities or to avoid consequences of such impurities by adding thereto a treating agent after the overhead has been condensed or has passed through the condenser.

Further, according to the present invention, in another of its broad forms the pressure on the condensed overhead is not released until after it has been contacted with and separated from the treating solution and there has been obtained a purified or treated distillate stream, which is used at least as a reflux for the distillation by admixing a treating agent with the condensate, maintaining the admixture thus produced until a desired extent of washing or purification has occurred, separating the treated condensate and treating agent, passing treated condensate to the distillation or fractionation producing said overhead, as reflux therefor and controlling the rate of removal from the system of treated condensate responsive to the pressure of said overhead. Since the system is maintained closed, such control, in effect, controls the pressure on the system and, therefore, on the overhead.

Still further, according to the invention, in another of its forms, the condensate is first treated with treating agent used as later described, it is separated from the treating agent, the thus once-treated condensate is admixed with fresh or unused treating agent, thus being treated a second time and, following separation of the condensate and treating agent after the second treatment, a portion of twice-treated condensate is used as reflux for the distillation producing the overhead forming the condensate, the once-used treating agent is then used for the first-mentioned treatment of the condensate and the remainder of the twice-treated condensate is released from the system at a rate controlled by the pressure of the overhead producing the same. Therefore, here too, the net effect is the control of the pressure on the overhead.

Still, according to the invention, purified condensate is introduced into the overhead vapor pipe and/or condenser at the place at which corrosion or harmful deposits tend to occur as components of the distillate begin to condense. This provides a protective coating for the equipment and washes away salts, etc., as these tend to concentrate out of the overhead.

Also, according to a more specific form of a part of this invention, there is provided a method and an apparatus for admixing substantially immiscible liquids which comprises flowing one of the liquids into an elongated pervious zone at one end and toward the other end thereof, flowing, in opposite direction, the other of the liquids in a zone contiguous to said pervious zone, thus causing a liquid emanating from said pervious zone to be sheared by the liquid flowing contiguously thereto, and removing the admixed liquids from the contiguous zone, the apparatus comprising, in one of its forms, a pipe closed at one of its ends, a pipe of smaller diameter penetrating through said closed end a substantial distance into the first pipe, forming an annulus, the wall of the portion of the penetrating pipe being pervious to liquids and a draw-off pipe in communication with said annulus adjacent the closed end of said pipe closed at one of its ends.

The treating agents useful according to the invention are well known to the art. Those mentioned herein are applicable. Overhead or distillate vapors other than petroleum distillate vapors which can be treated according to the present invention are those resulting from the synthesis of the various organic chemicals or compounds which are distilled from reaction masses in which there are present salts or other corrosive substances, such as acids, which tend to distill overhead with the product. Aqueous solutions of the following are examples of treating agents which can be used in my invention: sodium hydroxide, sodium carbonate, ammonia, calcium hydroxide, monoethanolamine, diethanolamine, triethanolamine, etc.

Referring now to the drawings, in FIGURE 1 is shown a single treating agent contact operation which includes a recycle of used, wash material. This embodiment of the invention recognizes that the recycle wash material will have an optimum concentration of impurities which are removed from the hydrocarbon or other distillate being treated, such optimum concentration varying with the individual operation. The provision of the recycle stream decreases the make-up requirement for fresh, wash material or solution.

FIGURE 2 shows a countercurrent two-stage washing system. A small amount of make-up solution contacts hydrocarbon which has been contacted with a considerably larger quantity of recycle fluid. Here use is made, advantageously, of partition coefficients and other factors. The partially used fluid from the second stage is employed as make-up for the first stage. Wash fluid having an optimum concentration of impurities is removed from the first contact stage. This embodiment possesses added economy in the double use of the washing fluid.

FIGURE 3 shows an apparatus which can be used to afford intimate contact of hydrocarbon and the aqueous reagent. This preferred apparatus or diffuser is a more specific and now preferred feature of the present invention.

Reading the description of the drawings, which now follows, it will be noted that there are provided various controllers for operational control and their use, as shown, is considered a part of my invention.

Referring now to FIGURE 1, a hydrocarbon stock, in this example of naphthenic gasoline stock 10, boiling in the range 120° F.–480° F., is charged to the conventional prefractionator unit 11 of a reforming operation, such as a catalytic reforming, one type of which, here described, is known in the art as Platforming operation. A bottoms material, boiling in the range 400° F.–480° F., too heavy to be charged to reforming is removed by pipe 12. A mid-boiling-point range hydrocarbon suitable for reforming charge stock, that is, boiling in the range 150° F.–400° F., is removed by pipe 13. Overhead vapors are removed by pipe 14 and condensed in condenser 15 and condensate passes by pipe 16 to diffuser 17, shown in detail in FIGURE 3. Fresh or make-up water 18 on flow control 19, along with partially used water 20, to be described later, passes via pipe 21, pump 22, and pipe 23 to diffuser unit 17 at a proportion of 1 gal. water to 2 gal. hydrocarbon. In the operation described, 3500 gallons per hour flow in pipe 16 and 1750 gallons per hour flow in pipe 23. The combined streams 16 and 23, thoroughly mixed or commingled in unit 17, pass by pipe 24 to the prefractionator overhead washer settler-accumulator 25. Draw-off water, containing components removed from the hydrocarbon fluid in pipe 16, is removed from vessel 25 on interface controller 26, actuating valve 27 in pipe 28. Washed hydrocarbon is removed by pipe 29 to reflux accumulator 30. Remaining water is removed from vessel 30 via leg 31 and pipe 31'. Treated hydrocarbon fluid is passed from vessel 30 by pipe 32, cooler-condenser 33, valve 34, actuated by pressure controller 35 and responsive to pressure in line 14, and line 36 into prefractionator overhead product separator 37. Any separated water is removed by pipe 38. Vapor product is removed from vessel 37 via pipe 39 on pressure control 40, controlling valve 41 in line 39. Liquid hydrocarbon is withdrawn from vessel 37 via pipe 42 and pump 43, controlled by valve 44, responsive to liquid level controller 45 on vessel 37. This liquid product is passed by pipe 46 to coalescer 47. In this conventional coalescer, substantially all of the remaining water solution is removed from the charge by pipe 48. Product is removed by pipe 49 on pressure controller 50, actuating valve 51. Partially used water 20, containing materials removed from the hydrocarbon, is recycled to an optimum impurities content, rather than operating on a once-through system, thus saving considerably on operating cost.

In the embodiment described, the pressures in the vessels are, respectively, vessel 11—40; vessel 25—35; vessel 30—35; vessel 37—25; and vessel 47—65 p.s.i.g. The temperature in pipe 14 is 160–180° F. The temperatures beyond the condenser are below about 150° F., substantially the temperature to which the distillate has been cooled in condenser 15. The exact temperatures maintained beyond condenser 15 are not critical to operativeness, provided these are not so high as to make it impractical or uneconomical to maintain liquid phase. At present, best operations are obtained using water or treating solution at about 100° F. Whenever heat of solution or reaction is involved, some rise in temperature is noted. Suitable adjustment as by using cooler water, an aerial cooler through which tank contents are circulated, is effected, as desired.

purities in said condensate otherwise ordinarily obtained, passing the commingled condensate and treating agent to a settling zone, therein causing separation of said condensate and treating agent, removing treating agent from said settling zone, removing condensate from said settling zone, passing said removed condensate to a reflux accumulating zone, passing a controlled proportion of condensate from said reflux accumulating zone to the distillation zone as reflux therefor, removing produced condensate from said last zone and controlling the rate of removal of produced condensate from said last zone, and, therefore, the pressure on the system, responsive to the pressure on said overhead.

2. A method according to claim 1 wherein the condensate removed from the said last zone is degasified and then treated in a coalescing zone for separation and removal of last traces of treating agent.

3. A method according to claim 1 wherein the condensate and treating agent are commingled by flowing one of the liquids into an elongated pervious zone at one end and toward the other end thereof, flowing in opposite direction the other of the liquids in a zone contiguous to said pervious zone, thus causing liquid emanating from said pervious zone to be sheared by the liquid flowing contiguously thereto, and removing the admixed liquids from the contiguous zone.

4. A method according to claim 1 wherein the treating agent is water.

5. A method for operating a distillation system which comprises condensing an overhead obtained from a distillation zone in said system, in a commingling zone commingling condensate immediately after it is formed with a used treating agent immiscible therewith effective to remove impurities from said condensate and, therefore, to reduce undesired effects upon equipment of said impurities in said condensate otherwise ordinarily obtained, passing the commingled condensate and treating agent to a settling zone, therein causing separation of said condensate and treating agent, removing treating agent from said settling zone, removing condensate from said settling zone, adding fresh treating agent to the system, passing said removed condensate to a reflux accumulating zone commingled together with fresh treating agent, allowing condensate and agent to settle in said last zone, passing a controlled proportion of condensate from said last zone to the distillation zone as reflux therefor, removing produced condensate from said last zone, removing treating agent from said last zone and using the same as said used treating agent, and controlling the rate of removal of produced condensate from said last zone and, therefore, the pressure on the system, responsive to the pressure on said overhead.

6. An apparatus for recovering and treating condensate which comprises, in combination, a distillation vessel, means for feeding a distilland to said vessel, means for removing an overhead vapor stream, means for condensing said stream, means for commingling a treating liquid with condensate obtained from said means for condensing, means for accumulating and settling the commingled condensate and treating liquid, means for removing treating liquid from said last means, means for removing treated condensate from said last means, means for contacting treated condensate with additional treating liquid freshly introduced into the apparatus, means for removing the additionally treated condensate from said means for contacting treated condensate, means for removing treating liquid from said means for contacting treated condensate, means for supplying said used treating liquid to said means for commingling with condensate a treating liquid, as said treating liquid, means for passing treated condensate removed from said means for contacting to said distillation vessel as reflux therefor, and means responsive to the pressure of the overhead vapor stream to control the rate of removal of treated condensate from the apparatus.

7. An apparatus according to claim 6 wherein said means for commingling with condensate a treating liquid comprises, in combination, a pipe closed at one of its ends, a pipe of smaller diameter penetrating through said closed end a substantial distance into the first pipe, forming an annulus, the wall of the portion of penetrating pipe being pervious to liquids and a draw-off pipe in communication with said annulus adjacent the closed end of said pipe closed at one of its ends.

8. A distillation apparatus comprising, in combination, a distillation vessel, a condenser for receiving and condensing vapors emanating from said distillation vessel, a vapor conduit for conducting vapors from said distillation vessel to said condenser, a conduit conducting condensate from said condenser to a treating container, a conduit for adding treating agent to said condensate in said treating container, means for separating treated condensate and treating agent, means upon said means for separating for removing from the apparatus used treating agent which has been separated from treated condensate and means for passing removed treated condensate separated from treating agent to said conduit for conducting vapors from said distillation vessel to said condenser and introducing said treated condensate just ahead of said condenser into said conduit for conducting vapors to said condenser.

9. A method for distilling a liquid which comprises feeding the same into a distilling zone under distilling conditions, removing any unvaporized feed from said zone, obtaining and removing overhead vapors of a distillate formed in said zone, passing said overhead to a condensing zone, condensing overhead in said condensing zone thus obtaining a condensate, commingling said condensate and a liquid treating agent substantially immiscible therewith in said condensing zone, passing the commingled liquids to a settling zone and therein settling said liquids to form phases, removing a treating agent phase and a treated condensate phase, passing treated condensate to a reflux supply zone, supplying from said supply zone reflux to said distillation zone, removing condensate from said supply zone, regulating the rate of said removing of condensate from said supply zone responsive to the pressure of said overhead, at all times maintaining and controlling the pressure on the system by means of said removing of condensate from said supply zone responsive to the pressure of said overhead, thus maintaining substantially constant the pressure of said overhead.

10. A method according to claim 9 wherein the level of the interface of the settling zone is controlled by drawing off used treating agent, wherein make-up treating agent is commingled with said condensate during said commingling with a portion of used treating agent and wherein the rate of recycle and addition of make-up treating agent are maintained substantially constant.

11. A method for distilling a liquid which comprises feeding the same into a distilling zone under distilling conditions, removing any unvaporized feed from said zone, obtaining and removing overhead vapors of a distillate formed in said zone, passing said overhead to a condensing zone, condensing overhead in said condensing zone thus obtaining a condensate, commingling said condensate and a used liquid treating agent substantially immiscible therewith in said condensing zone, passing the commingled liquids to a settling zone and therein settling said liquids to form phases, removing a treating agent phase and a treated condensate phase, mixing treated condensate with make-up treating agent, passing treated condensate together with make-up treating agent to a reflux supply zone, in said reflux supply zone settling the mixture into phases, obtaining used treating agent, using used treating agent as the used treating agent in said commingling said condensate and a used treating agent, supplying from said supply zone reflux to said distillation zone, removing condensate from said supply zone, regulating the rate of said removing of condensate from said supply zone It will be noted that the sequence and arrangement of steps according to the invention permits me to vary the total reflux to tower 11 while still maintaining a desired pressure in vapor pipe 14. Also, by the precise arrangement, it is possible advantageously, with only one control (at 34 and 35) to provide for circulation of reflux and used treating agent. The specific and simple arrangement is, therefore, especially desirable. As earlier indicated, the distillate is treated without increasing the pressure drop in the overhead vapor system. Similarly, there are realized the same or similar advantages in the dual treating agent, use of which the embodiment of FIGURE 2, which will now be described, is an example. The conditions in the operation of the embodiment of FIGURE 2 are essentially the same, except for the fact that make-up water is added to a second treating vessel, thereby improving materially the total purification effected with a given quantity of water due to more effective use of partition coefficient effects, etc.

Referring now to FIGURE 2 which shows two-stage countercurrent treatment of a hydrocarbon from the condenser operating on the overhead stream from a fractionator, the overhead vapors 100 pass via condenser 101 to the diffuser unit 17a. This fluid along with a water stream 102, after intimate mixing in unit 17a, are passed via line 103 to fractionator overhead primary washer accumulator 104. Separated water removed to disposal, such water containing impurities removed from the hydrocarbon charge, is passed via line 105, and valve 106 which is operated on interface control 107. Prewashed hydrocarbon is removed from unit 104 via line 108 to a second mixer or diffuser 17b. Fresh or make-up water on flow controller 109 is passed to diffuser 17b via line 110. The mixture of fresh water and hydrocarbon is passed via line 112 to the secondary overhead-washer-accumulator vessel 113. Used water containing impurities removed from the previously treated oil is removed from vessel 113 via line 114 and valve 115 which is controlled by interface controller 116 on vessel 113. This partially used water stream is charged as make-up to the first washer unit 104 via line 117. Recycle water from 104 is passed via line 118 and mixed with the cleaner water make-up 117, and the combined stream is pumped via line 102 to diffuser 17a as above described. Separated water draw-off 119 is shown on vessel 113, but this line is usually not used, except during shut-down operations. The product hydrocarbon from the final wash is passed from unit 113 via line 120, cooler-condenser 121, and valve 122 in line 123 to product separator 125. Valve 122 is actuated in response to the pressure in overhead line 100 from the fractionator (not shown) via pressure controller 124. On vessel 125, line 126 can be used to remove a water further separated therein. Vapor product is removed via line 127 on pressure control 128. Gasoline product is removed via line 129 on level controller 130.

Referring to FIGURE 3, there is shown the diffuser 17, described previously. Hydrocarbon, to be contacted with water or other aqueous solution, such as caustic, enters via 200. The water enters via pipe 201. The mixture exits via pipe 202. Unit 203, an extension of water pipe 201, is perforated at 204 to disperse the water into the hydrocarbon. Flow conditions and sizes are chosen to accomplish essentially turbulent flow to provide for intimate mixing of the treating agent and the organic material.

As a highly advantageous feature of the present invention, reflux for vessel 11 is provided by way of pipe 53, pump 54, pipe 55, equipped with a flow recorder controller, and pipe 56 (FIGURE 1). This reflux is purified condensate which dilutes the impurities in the overhead. Furthermore, as a further feature of the invention, purified condensate is passed by pipe 57 through heater 57' and pipe 58 into the pipe 14 at the point at which harmful deposits tend to begin to separate out from the vapor. It is not always necessary to preheat this condensate and some cases in which the quantity introduced is not great enough to substantially adversely affect the distillation operation or when some additional pressure drop can be tolerated. Since the condensate has been formed from the vapors, its introduction at a proper temperature can be effected without causing a significant pressure drop, as will be understood by those skilled in molal latent heat phenomena.

As a further feature of the invention, the treated condensate introduced to pipe 14 by way of pipe 58 preferably is introduced from an annular space surrounding a portion of pipe 14, pipe 14 having a plurality of perforations through which treated condensate within the annulus flows into pipe 14 substantially at the place in pipe 14 at which dropping out from the vapors or corrosive materials or other impurities tending to deposit there occurs. This introduction of treated condensate liquid can be intermittent if desired.

Other distillate materials which can be treated by my invention include: crude oil distillation overhead vapors; deethanizer, depropanizer, and debutanizer overhead vapors, etc.

The two stage washing operation as shown in FIGURE 2 is advantageous over the system of FIGURE 1 because the two stage system, using the same make up quantity of water as the system of FIGURE 1, removes more contaminants and circulates less water. This improvement is illustrated below.

| Gasoline | Treatment by— | |
|---|---|---|
| | Figure 1 system | Figure 2 system |
| Hydrocarbon (14) and (100): | | |
| Volume (as liquid), g.p.h | 3,500 | 3,500 |
| $H_2S$, p.p.m | 150 | 150 |
| Water wash fluid (23), volume, g.p.h | 1,750 | |
| Water wash fluid (102), volume, g.p.h | | 1,050 |
| Water wash fluid (110) and (18), volume, g.p.h | | |
| Hydrocarbon (42), $H_2S$, p.p.m | 250 | 250 |
| Hydrocarbon (129), $H_2S$, p.p.m | 30 | |
| | | 20 |

Reasonable variation and modification are possible within the scope of the foregoing disclosure, the drawings and the appended claims to the invention, the essence of which is that a distillate is treated to purify the same or to render innocuous therein impurities which are corrosive to equipment with which the condensed distillate is handled by adding a treating agent thereto after the distillate is condensed; after separation of treating agent from distillate, treated distillate is used as a reflux for the operation producing the distillate; pressure on the condensate is maintained substantially at that upon the overhead being condensed until the reflux has been obtained; pressure of the overhead is used to control the rate of release of the condensate produced from the system, thus maintaining the pressure of the overhead vapors at a desired value; in a specific embodiment countercurrent two-stage treatment is effected; purified condensate is introduced into the vapor line and/or into the condenser to act as a protective coating or wash to prevent corrosion or harmful deposits; liquids are intermingled by flowing them countercurrently in concentric pipes, one of which is liquid pervious; apparatus for accomplishing the invention has also been provided; and that method and apparatus for effectuating operation and control of the invention also have been set forth, as described herein.

I claim:
1. A method for operating a distillation system, which comprises condensing an overhead obtained from a distillation zone in said system, in a commingling zone, commingling condensate immediately after it is formed with a treating agent immiscible therewith effective to remove impurities from said condensate and, therefore, to reduce undesired effects upon equipment of said im- responsive to the pressure of said overhead, at all times maintaining and controlling the pressure on the system by means of said removing of condensate from said supply zone responsive to the pressure of said overhead, thus maintaining substantially constant the pressure of said overhead.

12. A method according to claim 1 wherein the treating agent is an alkaline solution.

13. An apparatus comprising, in combination, a distillation vessel, a condenser for receiving and condensing vapors emanating from said distillation vessel, a vapor conduit for conducting vapors from said distillation vessel to said condenser, a conduit conducting condensate from said condenser to a treating container, a conduit for adding treating agent to said condensate in said treating container, means for separating treated condensate and treating agent, means upon said means for separating for removing from the bottom of said means for separating, and from the apparatus used treating agent which has been separated from treated condensate, means, substantially above said means for removing used treating agent, from the bottom of said means for separating, for removing treated condensate from said means for separating, and means for passing removed treated condensate separated from treating agent to said conduit for conducting vapors from said distillation vessel to said condenser and introducing said treated condensate just ahead of said condenser into said conduit for conducting vapors to said condenser.

14. A method of operating a distillation system, which comprises condensing overhead obtained from a distillation zone in said system, intimately commingling the thus-formed condensate with a treating agent effective to reduce undesired effects upon equipment of impurities in said condensate by removing said impurities from said condensate, separating the treated condensate and treating agent, returning a portion of said treated condensate to the place of condensation, removing a second portion of said treated condensate from the system, and controlling the rate of removal of the condensate from the system responsive to the pressure on said overhead.

15. A method of operating a distillation system, which comprises condensing overhead obtained from a distillation zone in said system, intimately commingling the thus-formed condensate with a treating agent effective to reduce undesired effects upon equipment of impurities in said condensate by removing said impurities from said condensate, separating the treated condensate and treating agent, employing at least a portion of the treated condensate as the sole reflux for said distillation zone, removing treated condensate from the system, and controlling the rate of removal of the condensate from the system responsive to the pressure on said overhead.

16. A method of operating a distillation system which comprises condensing overhead obtained from a distillation zone in said system, intimately commingling the thus-formed condensate with a treating agent effective to reduce undesired effects upon equipment of impurities in said condensate by removing said impurities from said condensate, separating the treated condensate and treating agent, returning at least a portion of treated condensate into said overhead prior to its condensing as a wash, removing a second portion of said treated condensate from the system, and controlling the rate of removal of the condensate from the system and, therefore, the pressure on the system responsive to the pressure on said overhead.

17. A method for distilling a liquid and recovering a distillate vapor as a condensate and protecting a condensing zone against corrosion or harmful deposits which comprises distilling said liquid to obtain a vapor, obtaining condensate from said vapor, treating said condensate with a treating agent to purify the same, and returning said condensate into said vapor.

18. An apparatus for recovering and treating a condensate which comprises, in combination, a distillation vessel, means for feeding a distilland to said vessel, means for removing an overhead vapor stream, means for condensing said stream, means for commingling a treating liquid with condensate obtained from said means for condensing, means for accumulating and settling the commingled condensate and treating liquid, means for removing treating liquid from said means for accumulating, means for removing treated condensate from said means for accumulating, means for passing treated condensate removed from said means for accumulating to distillation vessel as reflux therefor, means for injecting treated condensate into said means for removing an overhead vapor stream just ahead of said means for condensing said stream, and means responsive to the pressure of the overhead vapor stream to control the rate of removal of treated condensate from the apparatus.

References Cited in the file of this patent

UNITED STATES PATENTS

| | | |
|---|---|---|
| 2,162,933 | Bolinger et al. | June 20, 1939 |
| 2,553,469 | Pellettere | May 15, 1951 |
| 2,611,740 | Berriman et al. | Sept. 23, 1952 |
| 2,692,764 | Hanson | Oct. 26, 1954 |
| 2,789,867 | Bloom et al. | Apr. 23, 1957 |
| 2,813,594 | Gantt | Nov. 19, 1957 |
| 2,890,156 | Vautrain | June 9, 1959 |